May 26, 1931. W. SMITH 1,806,956
BOX HANDLING TONGS
Original Filed Aug. 23, 1929
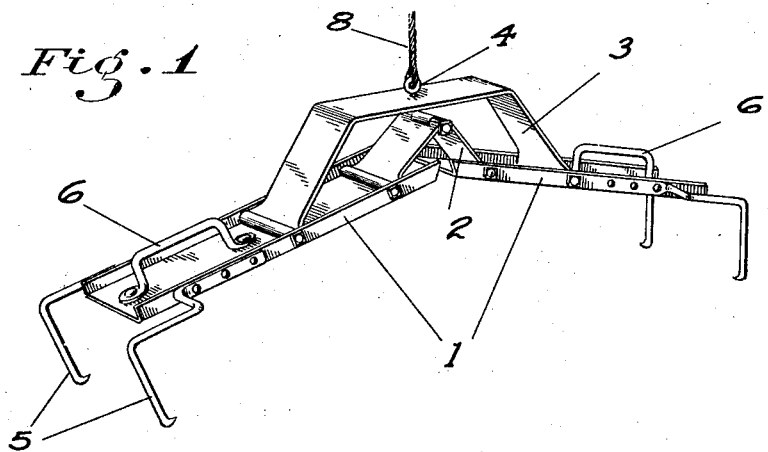
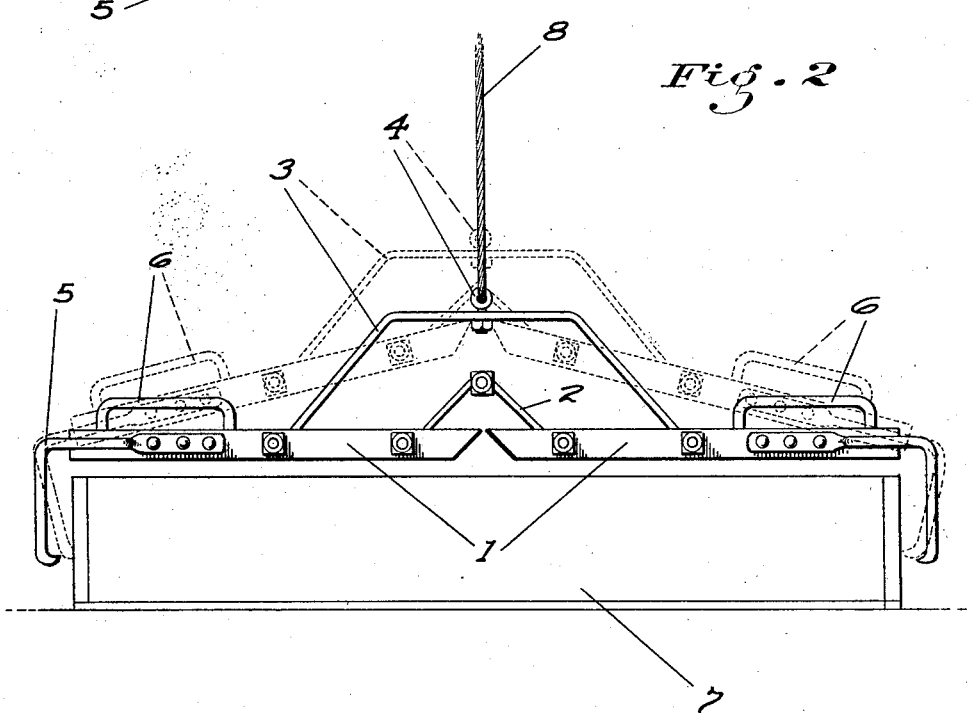
INVENTOR
Walter Smith
BY
ATTORNEY Patented May 26, 1931

1,806,956

UNITED STATES PATENT OFFICE

WALTER SMITH, OF MALAGA, CALIFORNIA

BOX HANDLING TONGS

Application filed August 23, 1929, Serial No. 387,941. Renewed October 18, 1930.

This invention relates to devices for handling boxes, especially sweat boxes in which dried fruit and the like is packed and which are of somewhat large size and relatively long and cannot well be lifted or otherwise handled by one unaided.

The principal object of my invention is to provide a tongs especially designed for handling such boxes as when loading, unloading or stacking the same, having hooks for engagement with the ends of the box and so constructed that as soon as a lifting pressure is applied to the bail of the doors said hooks will automatically grip the box so that the same may be then readily raised or lowered, and will be maintained while suspended in a proper substantially horizontal position.

A further object of the invention is to provide a simple and inexpensive device and yet one which will be exceedingly effective for the purpose for which it is designed.

These objects I accomplished by means of such structure and relative arrangement of parts as will fully appear by a perusal of the following specification and claims.

In the drawings similar characters of reference indicate corresponding parts in the several views:

Fig. 1 is a perspective view of the tongs as in its normal disengaged position.

Fig. 2 is a side view as applied to a box.

Referring now more particularly to the characters of reference on the drawings, the device comprises a pair of rigid body bars 1, longitudinally alined with each other and connected together near their adjacent ends by upstanding hinge links 2 arranged in inverted V-form. Substantially midway between the ends of the bars (but closer to their inner than to their outer ends) the ends of an upstanding rigid arched bail 3 have pivotal connection therewith; said bail extending over and above the links 2 in spaced relation thereto and being provided with a centrally disposed eye 4 for attachment to a lifting cable.

From the outer end of each bar a pair of rigid hooks 5 depend from and are rigidly secured thereto, said hooks being spaced transversely a greater distance than the width of the bar and the hooks on each end facing toward those on the opposite end of the device. Handles 6 project upwardly from the bars 1 near their outer ends.

The weight of the bars and the parts mounted thereon is so distributed relative to the pivotal connection of the bail therewith that the bars normally have a slight downward tilt toward their outer ends, as shown in Fig. 1. In operation the device is lowered over a box 7 until the bars 1 engage the same and assume a substantially horizontal position, the hooks then depending down outside the ends of the box. The length of the box is approximately the same as the distance between the hooks when the bars are outstretched so that as soon as a lift is applied to the cable 8 attached to the eye 4, and the bars tend to return to their normal tilted or angular position, the hooks firmly grip the ends of the box and enable the same to be lifted without danger of slipping.

The hinge links 2 steady and equalize the movement of the bars and insure their movement to symmetrical angular positions relative to each other and to the bail so that the box is maintained on a level as it is raised or lowered.

To disengage the tongs it is only necessary to slack on the cable and raise the bars by the handle 6, so as to draw the hooks clear of the box. After a slight lifting of the device by the cable the handles may be released, whereupon the tongs reassumes its normal position. The relatively great transverse space between the hooks enables the box to be gripped at correspondingly spaced points so as to avoid any possibility of the same tilting laterally as it is suspended in the air.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not appear from the spirit of the invention, as defined by the appended claims.

Having thus described my invention what

I claim as new and useful and desire to secure by Letters Patent is:

1. A box handling tongs comprising a pair of rigid members longitudinally alined with each other, a rigid arched bail upstanding from the bars and pivoted thereon at points closer to their adjacent than to their outer ends, whereby the bars when lifted normally tilt down toward their outer ends, hooks depending from the outer ends of the bars and facing each other, and means connecting the bars to cause their tilting movement to be equalized relative to each other and to the bail.

2. A box handling tongs comprising a pair of rigid members longitudinally alined with each other, a rigid arched bail upstanding from the bars and pivoted thereon at points closer to their adjacent than to their outer ends, whereby the bars when lifted normally tilt down toward their outer ends, hooks depending from the outer ends of the bars and facing each other, and equalizing links pivoted to the bars near their adjacent ends and extending thence vertically and converging relation to a pivotal connection with each other.

3. A box handling tongs comprising longitudinally alined bars, a bail connected in common to the bars for lifting the same as a unit, and a pair of transversely spaced hook members, for engagement with the outside of a box, secured to and depending from the outer end of each bar.

4. A box handling tongs comprising longitudinally alined bars, hooks to engage the outside of a box at opposed points depending from the opposite ends of the bars, and means for lifting the bars connected thereto in a manner to cause a lifting pressure to move the hooks toward each other.

5. A box handling tongs comprising longitudinally alined bars, hooks to engage the outside of a box at opposed points depending from the opposite ends of the bars, a bail common to both bars connected thereto in a manner to cause said bars when raised to have a downward tilt toward their outer ends, and hooks rigid with and depending from the outer ends of the bars; said hooks facing each other.

6. A structure as in claim 5, with means applied to the bars in a manner to cause the angle of tilt of the same to be equalized relative to each other and to the bail.

In testimony whereof I affix my signature.

WALTER SMITH.